(12) United States Patent
Greuel et al.

(10) Patent No.: US 9,296,610 B2
(45) Date of Patent: Mar. 29, 2016

(54) OPTICAL REACTOR AND DRIVING CIRCUIT FOR OPTICAL REACTOR

(75) Inventors: Georg Greuel, Roetgen (DE); Marc Maria Alex Bleukx, Mechelen (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 204 days.

(21) Appl. No.: 13/143,205

(22) PCT Filed: Dec. 22, 2009

(86) PCT No.: PCT/IB2009/055904
§ 371 (c)(1),
(2), (4) Date: Mar. 27, 2012

(87) PCT Pub. No.: WO2010/079401
PCT Pub. Date: Jul. 15, 2010

(65) Prior Publication Data
US 2012/0237409 A1    Sep. 20, 2012

Related U.S. Application Data

(60) Provisional application No. 61/176,632, filed on May 8, 2009.

(30) Foreign Application Priority Data

Jan. 6, 2009    (EP) .................................... 09150090

(51) Int. Cl.
*B01J 19/08*    (2006.01)
*C01B 13/10*   (2006.01)
*C02F 1/32*    (2006.01)
(Continued)

(52) U.S. Cl.
CPC ................. *C01B 13/10* (2013.01); *C02F 1/325*
(2013.01); *H01J 65/046* (2013.01); *H05B 41/16* (2013.01); *C02F 1/78* (2013.01); *C02F 2201/326* (2013.01);
(Continued)

(58) Field of Classification Search
CPC ......... H01J 65/046; H01J 61/34; H01J 61/56; H01J 65/00; H01J 61/30; H01J 61/0672; H01J 65/04; H05B 41/2881; H05B 41/16; C02F 1/325; C02F 1/78; C02F 2201/3223; C02F 2201/32; H01R 33/02; F21S 48/1109; C01B 13/10
USPC ....................................................... 422/186
See application file for complete search history.

(56) References Cited

U.S. PATENT DOCUMENTS 5,302,356 A    4/1994    Shadman et al.
5,660,719 A    8/1997    Kurtz et al.
(Continued)

FOREIGN PATENT DOCUMENTS

EP    1072558 A1    1/2001
WO    0230827 A1    4/2002
(Continued)

*Primary Examiner* — Xiuyu Tai

(57) ABSTRACT

An optical reactor has a reactor enclosure defining a reaction chamber. In the reaction chamber, a light source operating at a very high frequency is arranged to radiate light to a fluid to be treated. A low voltage electrode is arranged to surround the light source. The light source is energized by a driving circuit which is arranged adjacent to the reactor enclosure. The driving circuit has a high voltage output terminal connected to a high voltage input terminal of the light source. The driving circuit has a low voltage output terminal which is connected to the low voltage electrode.

11 Claims, 11 Drawing Sheets

(51) Int. Cl.
　　*H01J 65/04*　　(2006.01)
　　*H05B 41/16*　　(2006.01)
　　*C02F 1/78*　　(2006.01)

(52) U.S. Cl.
　　CPC ... *C02F 2201/328* (2013.01); *C02F 2201/3223* (2013.01); *C02F 2201/782* (2013.01)

(56) References Cited

U.S. PATENT DOCUMENTS

| | | | |
|---|---|---|---|
| 5,792,433 | A | 8/1998 | Kadoya |
| 6,193,894 | B1 | 2/2001 | Hollander |
| 6,193,939 | B1 | 2/2001 | Kozlowski |
| 6,201,355 | B1 | 3/2001 | Morgan et al. |
| 2002/0089275 | A1 | 7/2002 | Falkenstein |
| 2003/0122092 | A1 | 7/2003 | Sarchese et al. |
| 2005/0118078 | A1* | 6/2005 | Dobbs et al. ............... 422/186.3 |
| 2006/0066245 | A1* | 3/2006 | Bschorer et al. ............... 315/56 |
| 2006/0144691 | A1* | 7/2006 | Barnes et al. ............... 204/157.5 |

FOREIGN PATENT DOCUMENTS

| | | | |
|---|---|---|---|
| WO | 0230828 | A2 | 4/2002 |
| WO | 2006056921 | A2 | 6/2006 |
| WO | WO 2006/079982 | * | 8/2006 |

* cited by examiner

OPTICAL REACTOR AND DRIVING CIRCUIT FOR OPTICAL REACTOR

FIELD OF THE INVENTION

The invention relates to the field of optical reactors or photo-reactors, and more specifically to a treatment system of fluids by light. Optical treatment of a fluid may be sterilization, disinfection, killing or de-activating micro-organisms, oxidation or decomposition of matter, etc. by light, in particular, but not exclusively, by ultraviolet (UV) light. The invention also relates to a driving circuit for an optical reactor.

BACKGROUND OF THE INVENTION

In conventional optical reactors or photo-reactors, a light source is used to treat a fluid in a reaction chamber formed by an enclosure. The light source may be immersed in the fluid, possibly with a transparent sleeve around it. Alternatively, the light source may be arranged outside the fluid, and optical means like reflectors may be used to direct the light produced by the light source towards and into the fluid. The combination of at least the light source and the enclosure, either formed as a flow-through enclosure or as a batch container, will be referred to as a reactor.

One known approach contemplates an elongated light source (UV light producing discharge lamp) having a transparent sleeve made of quartz glass around it. A cylindrical housing contains the light source and the sleeve, as well as a driving circuit. The driving circuit is located at or near one end of the light source, either inside the sleeve or outside the sleeve in close proximity thereto. From the driving circuit, electrical connections are to be made to both ends of the light source. A fluid to be treated flows in a reaction chamber defined by (between) the sleeve and the housing. A cooling of the housing, and thereby also a cooling of the driving circuit, is performed by the fluid.

One disadvantage of this approach is that the electrical connection between the light source and a driver circuit has electrical impedance, which acts as a series inductance and a parallel capacitance between the light source and the driving circuit. This parasitic electrical impedance prevents the use of high frequencies in driving the light source, and thereby prevents the use of particular light sources operating at such high frequencies.

Another disadvantage of the approach above is its low electrical safety and electrical shielding. The electrical driving circuit, an electrical connection from the driving circuit to the light source, and light source electrical contacts must be insulated. Constructional measures must be taken to protect an operator from electrical shock, to reduce generation of electromagnetic radiation and distortions, and to minimize pick-up of electromagnetic disturbances.

SUMMARY OF THE INVENTION

It would be desirable to provide an optical reactor employing a light source operating at high frequencies, which would address at least some of the shortcomings of conventional techniques. It would also be desirable to provide a driving circuit for such an optical reactor.

Accordingly, in a first aspect of the invention an optical reactor is provided that comprises: a reactor enclosure comprising a reaction chamber having an inner surface; a light source disposed at least partially within the reaction chamber, the light source having a high voltage input terminal; a low voltage electrode arranged to at least partially surround the light source; a driving circuit for energizing the light source, the driving circuit being arranged adjacent to the reactor enclosure, wherein the driving circuit has a high voltage output terminal connected to the high voltage input terminal of the light source, and a low voltage output terminal connected to the low voltage electrode. The low voltage electrode comprises an electrically conductive material arranged to surround the light source at least partly, e.g. as a hollow cylindrical shape provided around the lamp. The term "surround" is to be understood to designate a configuration where the electrode forms in at least one cross-section a closed shape around the lamp. It is possible, but not necessary, that the electrode is completely closed around the lamp on all sides. Preferably, the electrode encloses the lamp at least in a central position, further preferably over more than half the length of the lamp. Most preferably, the electrode encloses the lamp over its entire length.

In many embodiments, the electrode is provided at the reactor enclosure. For example, the reactor enclosure may be completely or partially made out of or contain an electrically conductive material to act as low voltage electrode. The electrically conductive material may e.g. be provided as an electrically conductive layer on the inner surface of the reactor chamber and/or over the outer surface of the reactor enclosure.

The optical reactor, according to various embodiments of the invention, allows the use of gas discharge lamps of a type based on dielectric barrier discharge as a light source. For such lamps, in order to have high lamp efficiency an AC voltage preferably having a high slope, typically above $10^9$ V/s or $10^{10}$ V/s, is applied to the lamp. Stray impedances are reduced so that high voltage slopes are possible. In many embodiments, there is no cable connection between the driving circuit and the lamp, and in operation the (electrically conducting) fluid to be treated as well as the low voltage electrode, preferably arranged at the reactor wall, are part of the electrical circuit for driving the lamp. Thus, in these embodiments, there is only a single high voltage connection to the light source.

In another aspect of the invention, a driving circuit for the optical reactor of the invention is provided.

These and other aspects of the invention will be more readily appreciated as the same becomes better understood by reference to the following detailed description and considered in connection with the accompanying drawings in which like reference symbols designate like parts.

DETAILED DESCRIPTION

Figure 1:
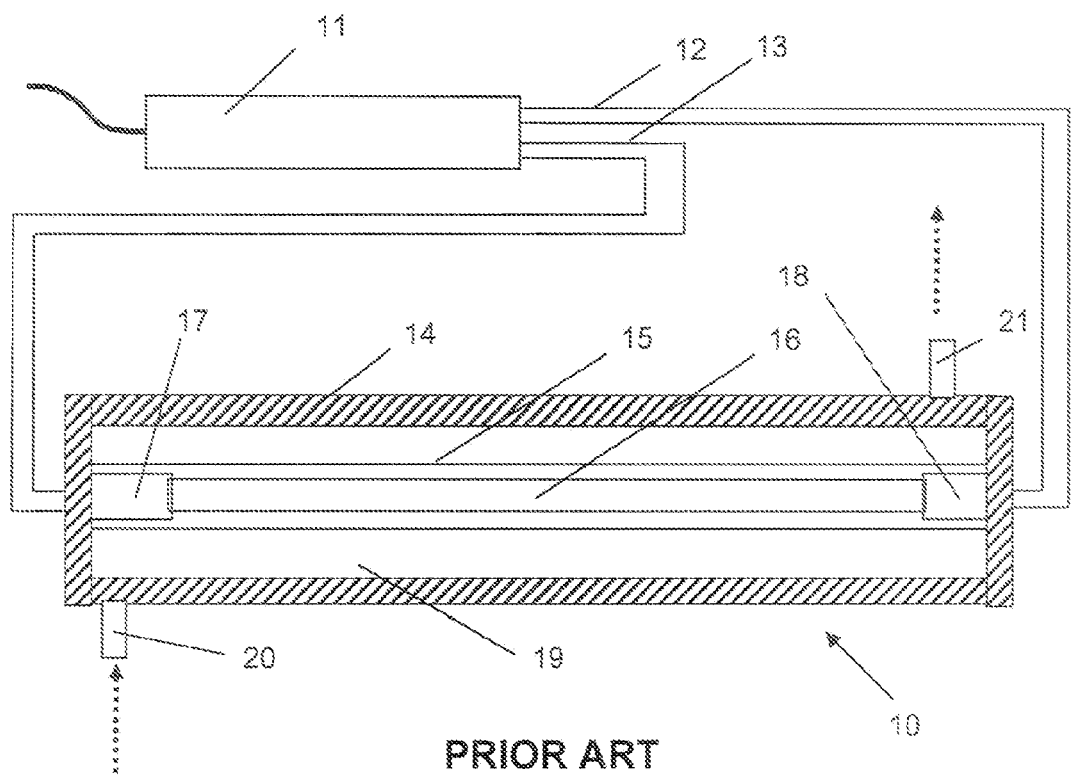
FIG. 1 schematically depicts a longitudinal view, partially in cross-section, of an optical reactor and a driving circuit according to a prior art.

FIG. 1 depicts a prior art optical reactor 10 comprising an elongated light source or lamp 16 having electrical terminals (not shown in detail) at both ends thereof. The lamp 16 is mounted mechanically and electrically in sockets 17 and 18. Socket 17 is connected to a driving circuit 11 through a cable 13, and socket 18 is connected to the driving circuit 11 through a cable 12. Thus, an alternating voltage of appropriate shape can be applied, and an alternating current of appropriate shape can be supplied to the lamp 16 by the driving circuit 11. The driving circuit 11 draws its input power from a power source such as a mains voltage or a battery.

The lamp 16 is enclosed by an elongated sleeve 15 made e.g. from quartz glass or any other material which transmits the effective light produced by the lamp in operation. The reactor 10 further comprises an enclosure 14. Space between the sleeve 15 and the enclosure 14 defines a reaction chamber 19. The enclosure 14 has an inlet 20 for supplying a fluid (being a gas or a liquid, or a combination thereof) to the reaction chamber 19, and an outlet 21 for discharging the fluid from the reaction chamber 19, as indicated by dotted arrows in FIG. 1.

In operation, the lamp 16 radiates light, such as ultraviolet (UV) light, through the sleeve 15 to the fluid flowing in the reaction chamber 19, thereby treating the fluid as desired.

The cables 12 and 13 present a potential hazard of electrical shock, produce electromagnetic radiation, and may pick up electromagnetic distortions. Also, the cables 12 and 13 have an electrical impedance which mainly can be represented by a series inductance and a parallel capacitance (see also FIG. 8 and the corresponding description for a discussion thereof), which act as a high-frequency filter, thereby preventing the use of a lamp 16 requiring a high frequency supply or a very high frequency supply (typically having voltage slopes of at least $10^9$ V/s) to function in an optimum manner.

Figure 2:
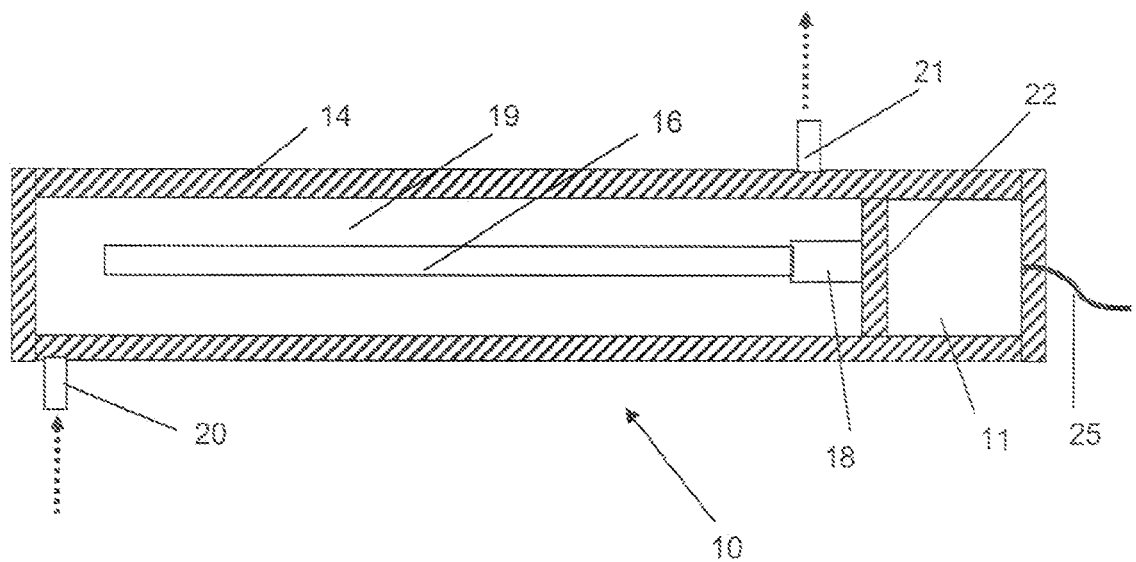
FIGS. 2 and 2a-2e schematically depict different embodiments of optical reactors according to the present invention in a longitudinal view, partially in cross-section.
Figure 2A:
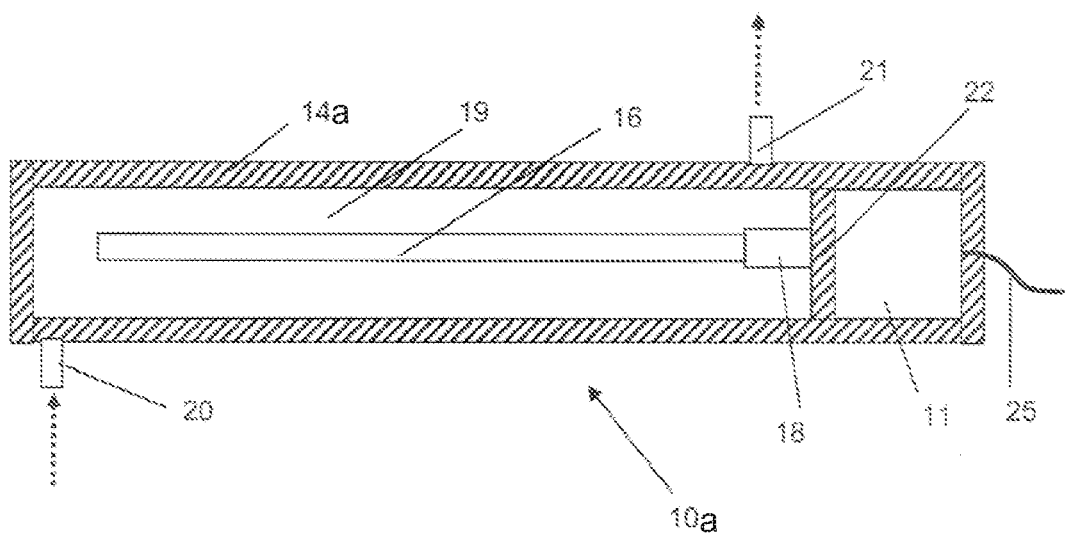

FIG. 2 shows an embodiment of an optical reactor 10, with variations thereof shown in FIGS. 2 a-2e. For example, FIG. 2a shows a first embodiment of an optical reactor 10a according to one embodiment of the invention. Here, the driving circuit 11 is accommodated in the enclosure 14a at one end thereof. No sleeve is present around the lamp. The enclosure 14a, according to this embodiment, is made from, or contains, an electrically conductive material, such as a metal. Making the enclosure 14a electrically conductive provides for an intrinsically safe reactor 10, because the driving circuit 11 is totally enclosed and cannot be touched, neither directly, nor indirectly, e.g. via condense water films or via dust and dirt films generating potential leakage paths from the driving circuit to outer surfaces which might be touched by operators. Thus, the risk from electrical shock to operators is reduced. Furthermore, electromagnetic emission is reduced, and immunity against electromagnetic distortion is increased. The enclosure may be connected to ground potential. The electrically conductive enclosure 14a (or the electrically conductive parts of it) act as a low voltage electrode for the lamp 16. It is arranged to surround the lamp 16 not only in a central cross-section, but over the entire length of the lamp 16. In the embodiment shown in FIG. 2a, the low voltage electrode 14a even totally encloses the lamp 16 to all sides.

The reactor 10a is powered by a mains supply or a battery through a cable 25, and thus can be used anywhere where at least one of such power supplies is available. The driving circuit 11 is separated from the reaction chamber 19 by a separation wall 22. The driving circuit 11 is electrically connected to the lamp 16, in a manner e.g. described in more detail below with reference to FIG. 6, such that the lamp 16 is supplied via a single high voltage electrical connection to the lamp 16 through the separation wall 22, and a second electrical connection to the lamp 16 by the reactor enclosure 14 and the fluid to be treated in the reaction chamber 19. Having a single high voltage connection to the lamp 16 reduces undesired stray impedances. Due to the elimination of cabling between the driving circuit 11 and the lamp 16 contemplated by various embodiments of the invention, an output signal from the driving circuit 11 is identical to the signal applied to the lamp, and no electrical losses occur between the driving circuit 11 and the lamp 16.

With the driving circuit 11 being included into the enclosure 14a, the cooling of the driving circuit 11 is effected by the fluid to be treated in the reactor 10a. The overall size of the reactor 10a is relatively small compared to a reactor having an external driving circuit, like the one shown in FIG. 1. Maintenance of the reactor 10a of FIG. 2a is relatively easy when a simple plug and socket connection is selected for the high voltage connection between the driving circuit 11 and the lamp 16. The reactor 10a is mechanically robust, and can in an advantageous manner withstand mechanical stress from temperature variations, vibrations, bumping into other structures, etc. The reactor 10a may be sealed off from the external environment.

Figure 2B:
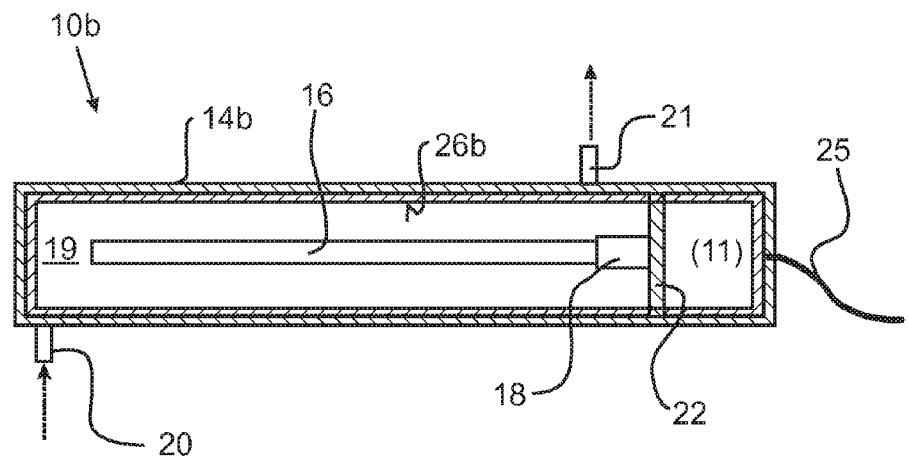

FIG. 2b shows an optical reactor 10b according to another embodiment of the invention. The optical reactor 10b according to this embodiment is generally similar to the optical reactor 10a according to the embodiment discussed above in connection with FIG. 2a with like parts being referenced by like numerals. In the following, only differences between the embodiments will be explained.

Other than in the first embodiment, the optical reactor 10b according to the second embodiment is not entirely made of an electrically conductive material. Instead, the optical reactor 10b comprises an elongate enclosure 14b made out of an electrically non-conductive material, e.g. out of a plastic material. On the inside, the enclosure 14b comprises a layer 26b out of an electrically conductive material. The layer 26b thus forms a low voltage electrode surrounding the lamp 16. The low voltage electrode 26b in operation may be coupled to the lamp 16 either capacitively, or conductively through a conductive fluid, or both. The electrically conductive layer 26b may be a separately manufactured body, e.g. out of metal, which is inserted into the enclosure 14b out of the plastic material. Alternatively, the electrically conductive layer 26b may be a thin metallic coating on the inside of the enclosure 14b out of the plastic material.

The optical reactor 10b according to the second embodiment provides the same advantages and properties as the optical reactor 10a according to the first embodiment. Additionally, an enclosure 14b out of a plastic material provided with an electrically conductive layer 26b may be manufactured inexpensively and in a wide variety of shapes.

Figure 2C:
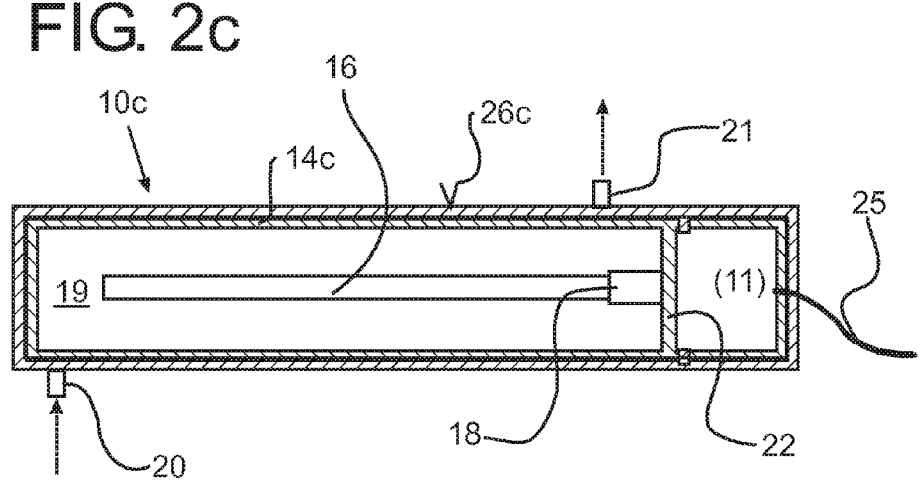

FIG. 2c shows an optical reactor 10c according to a third embodiment of the invention. As in connection with the second embodiment, like parts are referenced by like numerals and only differences with regard to the above explained embodiments will be discussed.

As in the second embodiment discussed above in connection with FIG. 2b, also in the third embodiment there is provided an enclosure 14c out of an electrically non-conductive material, which is provided with an electrically conductive layer 26c. However, the electrically conductive layer 26c is provided on the outside of the enclosure 14c. The layer 26c thus forms an electrode surrounding the lamp 16 and the driving circuit 11. Thus, while the electrically conductive layer 26c is directly electrically connected to the driving circuit 11 through electrical contacts provided in the enclosure 14c, it is not in direct electrical contact with the inside of the reaction chamber 19.

In operation, the lamp 16 is driven by a high frequency voltage. The electrically non-conductive enclosure 14c in this case acts as a dielectric, through which electrical power may be capacitively coupled to an electrically conductive medium contained within the reaction chamber 19, or, in case of an electrically non-conductive fluid, such as a gas, power is directly capacitively coupled to the lamp 16.

Figure 2D:
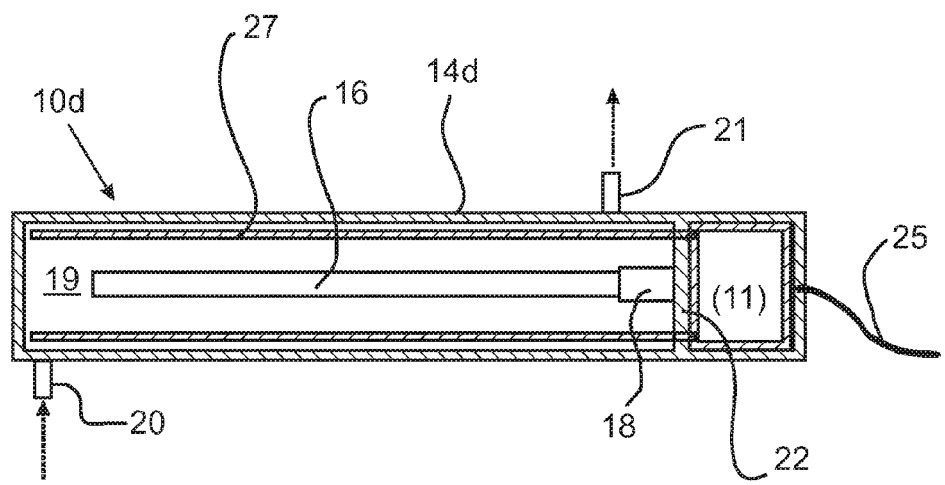

FIG. 2d shows an optical reactor 10d according to a fourth embodiment of the invention. As above, parts identical to the previous embodiments are referenced by like numerals and only differences will be explained.

The optical reactor 10d according to the fourth embodiment includes an enclosure 14d made out of an electrically non-conductive material, such as plastic. In the optical reactor 10d, the low voltage electrode connected to the driving circuit 11 is provided within the reaction chamber 19 as a separate electrode made out of an electrically conductive material, e.g. metal. The electrode 27 is provided as a wire mesh of hollow cylindrical shape arranged around the lamp 16 and in electrical contact to the reaction chamber 19. Vias are provided through the separation wall 22 to electrically connect the wire mesh electrode 27 to the driving circuit 11. The electrode 27 is provided at the enclosure 14d in a shape surrounding the lamp 16.

In operation of the optical reactor 14d, electrical power from the driving circuit 11 is coupled to the lamp 16 from the electrode 27 either through pure capacitive coupling in the case of an electrically insulating fluid, e.g. a gas, contained within the reaction chamber 19, or, in the case of an electrically conducting fluid such as water, also by direct electrical conduction through the fluid.

Figure 2E:
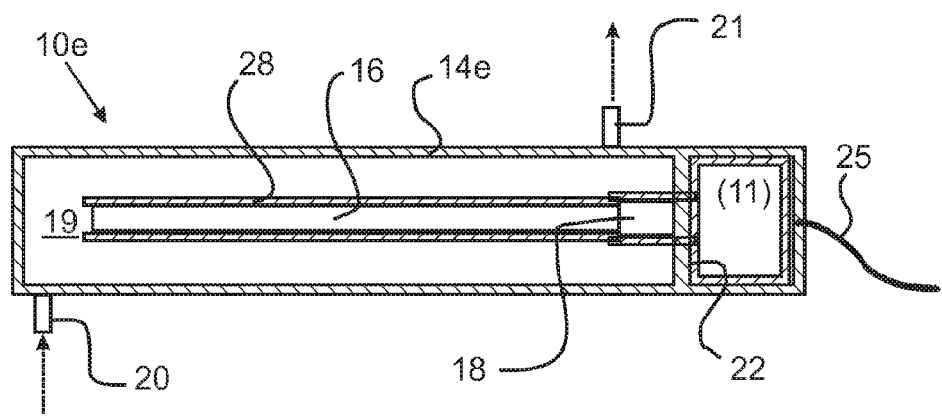

FIG. 2e shows an optical reactor 10e according to a fifth embodiment of the invention. As above, parts identical to the above explained embodiments are referenced by like numerals and only differences will be explained.

The optical reactor 10e according to the fifth embodiment may comprise an electrically conductive or alternatively an electrically non-conductive enclosure 14e. A low voltage electrode 28 is arranged adjacent to the lamp 16 in a way surrounding the lamp 16. The electrode 28 in this case is optically transparent to the UV radiation generated by the lamp 16. Preferably, the electrode 28 is provided as a wire grid of hollow cylindrical shape closely surrounding the lamp 16 to provide for capacitive coupling and, in the case of an electrically conductive fluid contained in the reaction chamber 19, also additional conductive coupling.

While above optical reactors 10a-10e according to the first to fifth embodiment of the invention have been discussed, in the following further details regarding construction and operation of optical reactors according to the invention will be explained. In the following description an optical reactor 10 comprising an electrically conductive enclosure 14a as in the first embodiment of the invention (FIG. 2a) will be assumed. However, it should be understood that this is by way of example only and that alternatively any of the above described embodiments may be used in its place.

Figure 3:
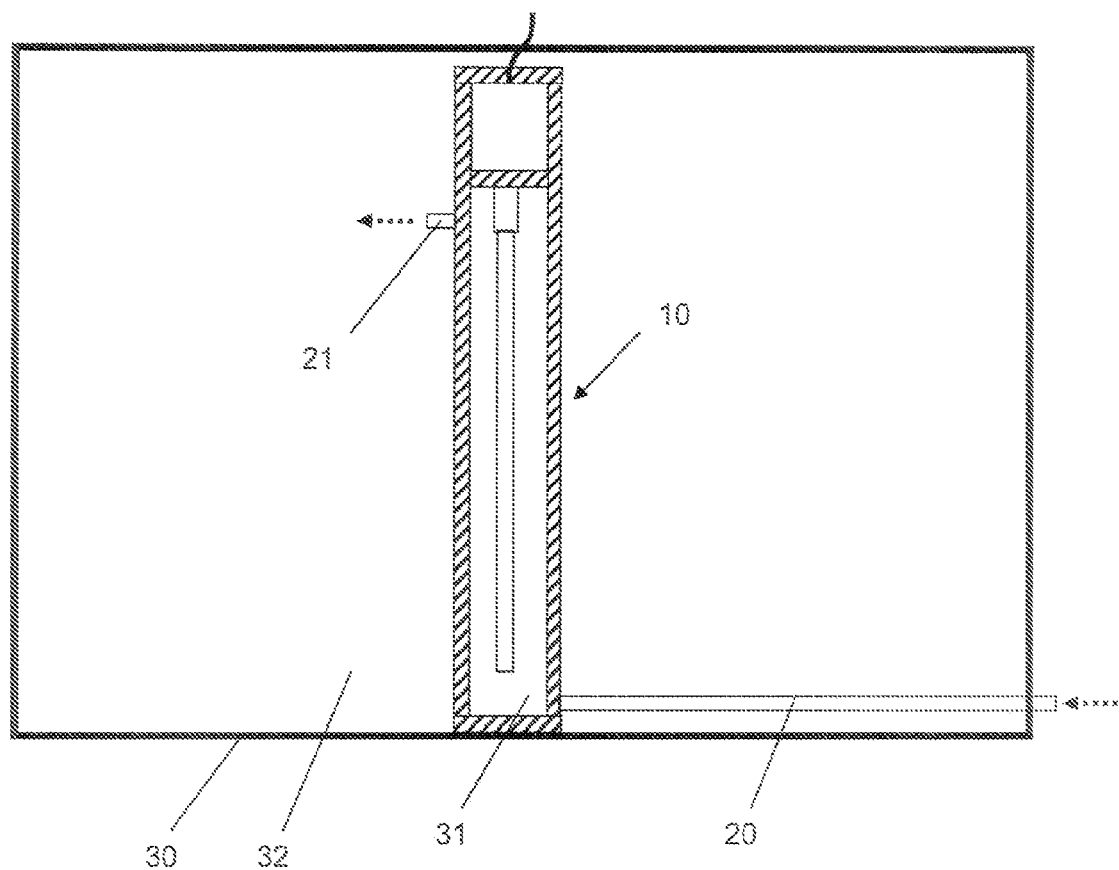
FIG. 3 schematically depicts a longitudinal view, partially in cross-section, of the optical reactor of FIG. 2 in a container with a fluid to be treated.

As illustrated in FIG. 3, the reactor 10 may be immersed into the fluid to be treated held in a container 30, or in a secondary fluid 32 to be treated with a primary fluid 31 or a component thereof produced within the reactor 10.

For example, a primary fluid 31 to be treated in the reactor is oxygen gas, or a mixture of gases containing oxygen gas. The primary fluid 31 is supplied to the reactor by inlet 20 from outside the container 30. In the reactor 10, the light from the lamp 16 produces ozone in the primary fluid 31. From the outlet 21, the ozone enriched primary fluid 31 is mixed with the secondary fluid 32, for example water containing a biological contamination. The ozone decomposes or de-activates the biological contamination.

Figure 4:
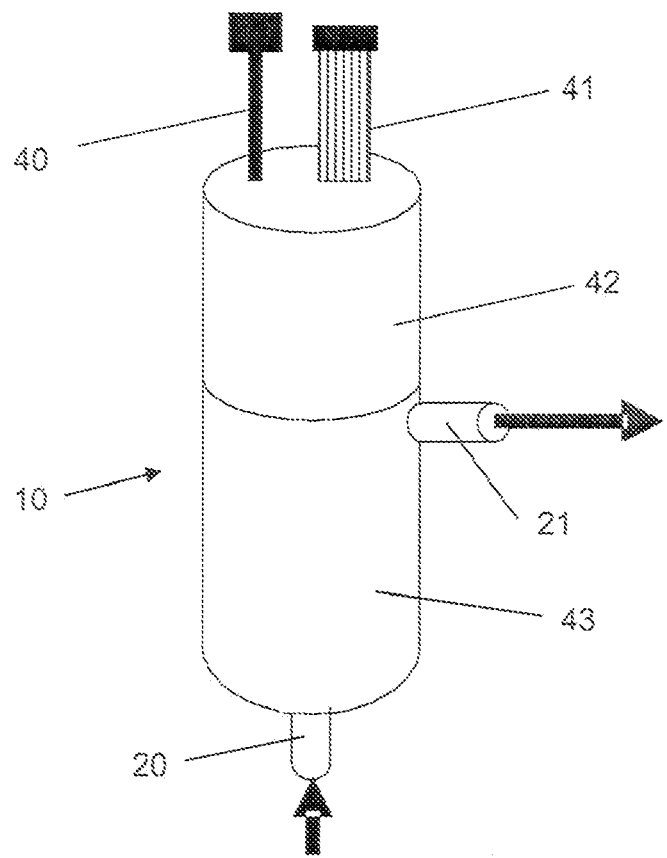
FIG. 4 illustrates a perspective view of a further embodiment of an optical reactor of the present invention.

FIG. 4 illustrates a perspective view of a reactor 10 having an enclosure 14 with an inlet 20 and an outlet 21, a mains input cable 40, and a cable 41 having a zero insertion force (ZIF) connector, or another suitable type of connector. The cable 41 serves to transmit and/or receive sensing and control signals to/from the driving circuit accommodated in a driving circuit section 42 of the reactor 10. One or more light sources are accommodated in a lamp section 43 of the reactor 10. The driving circuit section 42 and the lamp section 43 may have separate enclosures.

Figure 5:
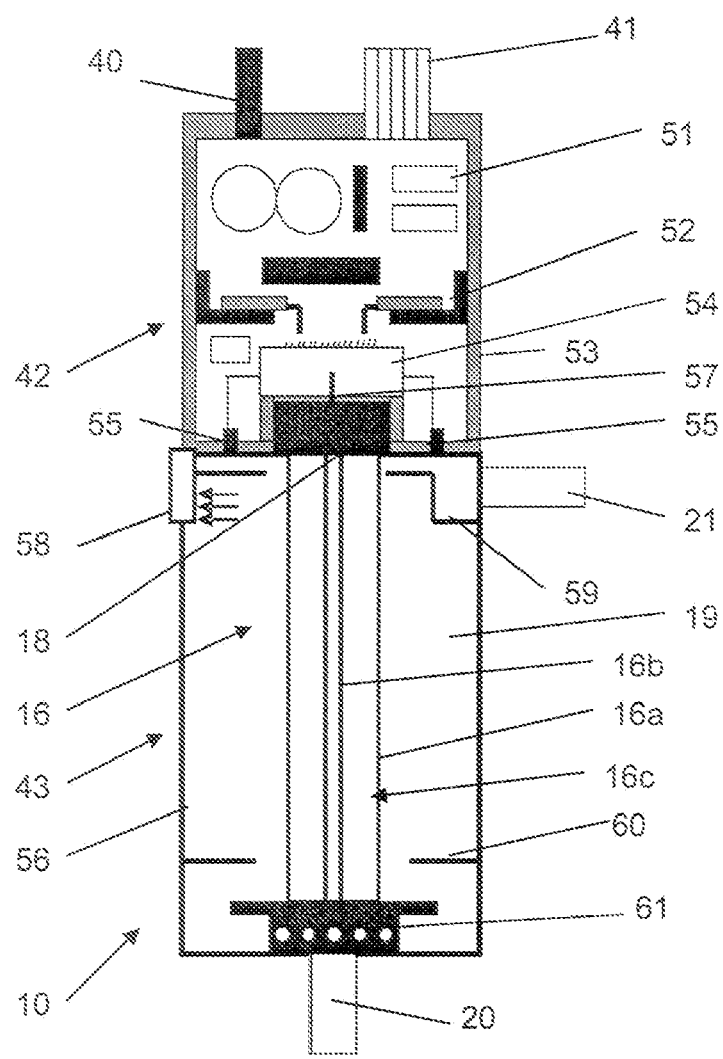
FIG. 5 illustrates a longitudinal view, partially in cross-section, of the optical reactor of FIG. 4.

Referring to FIG. 5, the driving circuit section 42 of the reactor 10 contains several electric components 51, power semiconductors 52 thermally connected to an enclosure 53 of the driving circuit section 42 for cooling purposes, and a high voltage transformer 54 having one or more terminals 55 connected to an enclosure 56 of the lamp section 43, and one terminal 57 connected to the lamp 16 mounted in socket 18.

The enclosure 53 of the driving circuit section 42 advantageously is made from, or contains an electrically conductive material, or at least on the inside or outside thereof is at least partly clad with an electrically conductive material. The enclosure 56 of the lamp section 43 is made from, or contains an electrically conductive material, or at least on the inside thereof is at least partly clad with an electrically conductive material.

The lamp section 43 comprises a lamp 16 having an outer (e.g. glass) tube 16a, an inner (e.g. glass) rod or tube 16b, and a discharge gap between the inner tube 16b and the outer tube 16a. In a practical embodiment, the inner tube 16b is provided with an electrically conductive coating, or a conductivity powder, at the side thereof facing the outer tube 16a, with an electrical connection to a high voltage terminal of the lamp 16. The discharge gap is a capillary having a diameter of typically 2 . . . 4 mm. The outer (e.g. quartz) tube 16a has a diameter of typically 10 . . . 20 mm.

A detector 58 is provided to detect an operational state of the lamp 16 (such as: on, off, amount of light produced) by measuring the amount of radiation, in particular the radiation in a particular wavelength range. The detector 58 e.g. may be adapted to detect UV-C radiation when the lamp 16 produces such light.

The lamp section further comprises flow guiding elements 59, 60 and diffuser plate 61 to ensure an optimum flow of fluid to be treated in the reactor for a most effective treatment.

Figure 6:
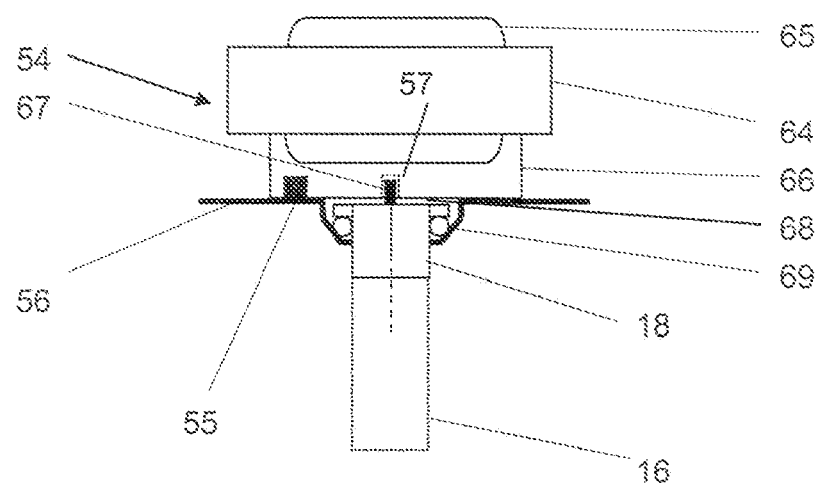
FIG. 6 illustrates a detail of an electrical and mechanical connection between a driving circuit and a light source in an embodiment of an optical reactor according to various embodiments of the present invention, such as the embodiment of FIG. 4.

FIG. 6 illustrates a high voltage transformer 54 of the driving circuit 11, the transformer 54 comprising a transformer core 64 and transformer windings 65. The transformer 54 is mounted on a support 66 provided on the enclosure 56 of the lamp section 43. The support 66 may be made of an electrically insulating material of low magnetic permeability (<3). The terminal 57 of (a secondary winding of) the transformer 54 is shaped as an electrical socket to receive a pin 67 (high voltage terminal) of the lamp 16 or its socket 18. One or more terminals 55 of (the secondary winding of) the transformer 54 are in electrical contact with the enclosure 56 of the lamp section 43 through the support 66, e.g. by being welded or soldered to the enclosure 56, or by being pressed against, or otherwise connected with, the electrically conducting enclosure 56 or electrically conducting part thereof.

If the fluid in the reaction chamber has a low conductivity (e.g. below 50 µS/cm, i.e. a resistance above 200 Ωm), then the outer tube 16a of the lamp 16 is provided with an outer electrode 16c, e.g. in the form of an electrically conducting wire mesh provided on the side of the outer tube 16a facing the reaction chamber 19. The outer electrode of the lamp is electrically connected to the terminal(s) 55 of the transformer 54.

The socket 18 has a shoulder 68 which, interacting with a cup-shaped part of the enclosure 56, compresses a sealing ring 69 to avoid fluid in the lamp section 43 to reach the driving circuit section 42.

Figure 7:
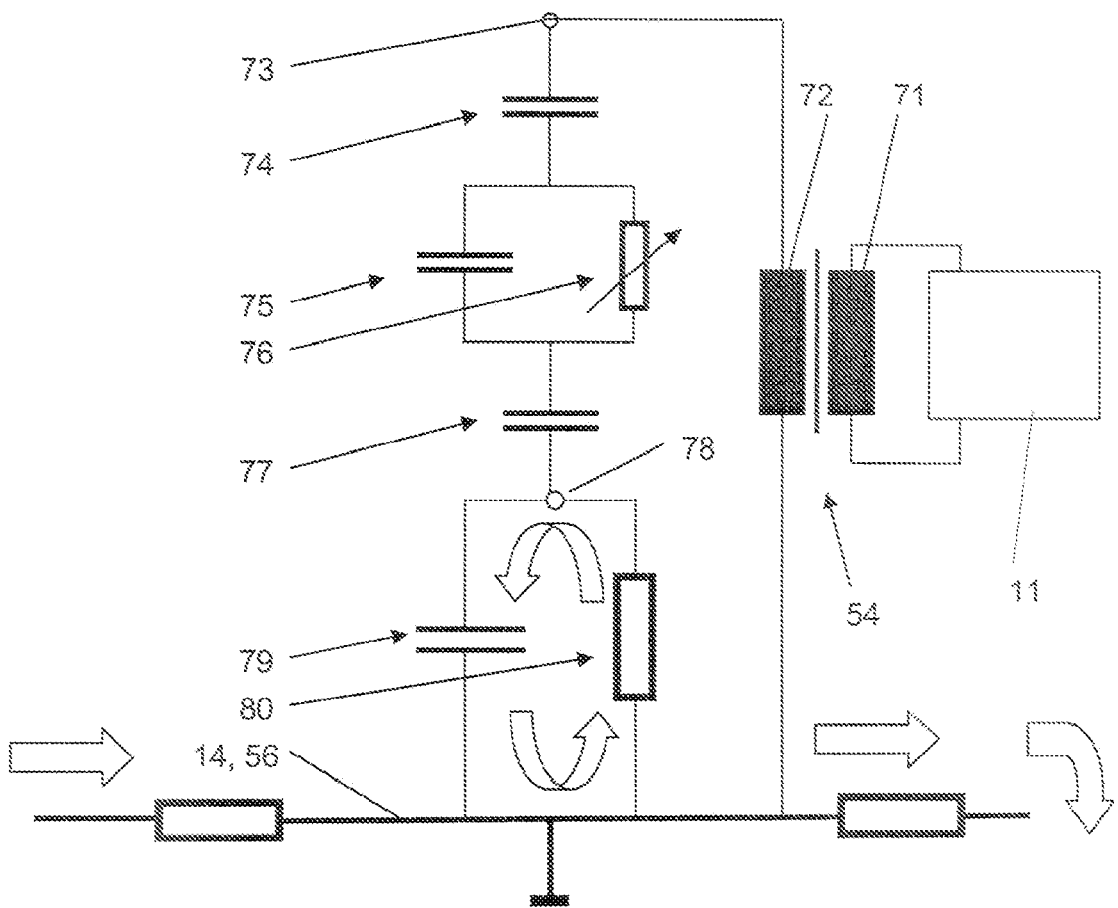
FIG. 7 illustrates a network configuration for illustration of electric advantages in a light source driving circuit according to various embodiments of the present invention.

FIG. 7 illustrates an electrical circuit of reactor 10. The transformer 54 has a primary winding 71 connected to the remaining driving circuit 11, and a secondary winding 72 having a high voltage output terminal connected, preferably directly, to a high voltage lamp terminal 73, and another terminal connected to the enclosure 14, 56. In electrical terms, the lamp 16, in particular a dielectric barrier discharge (DBD) type lamp, may be represented as a first capacitor 74 representing an inner tube, connected in series with a parallel arrangement of a second capacitor 75 and a variable resistor 76 representing a discharge gap, and connected further in series with a third capacitor 77 representing an outer tube. A low voltage lamp terminal 78 is in electrical contact with the fluid in the reactor, represented by a parallel arrangement of a fourth capacitor 79 and a resistor 80, which fluid in turn is in electrical contact with the enclosure 14, 56. Fluid flow is illustrated by arrows.

The low voltage lamp terminal may simply be the electrically conducting fluid in the reaction chamber 19 contacting the outer (e.g. glass) tube 16a of the lamp 16. The low voltage lamp terminal may also be an outer electrode provided on the outside of the outer tube 16a, and electrically connected to the (low voltage output terminal of the) driving circuit.

Figure 8:
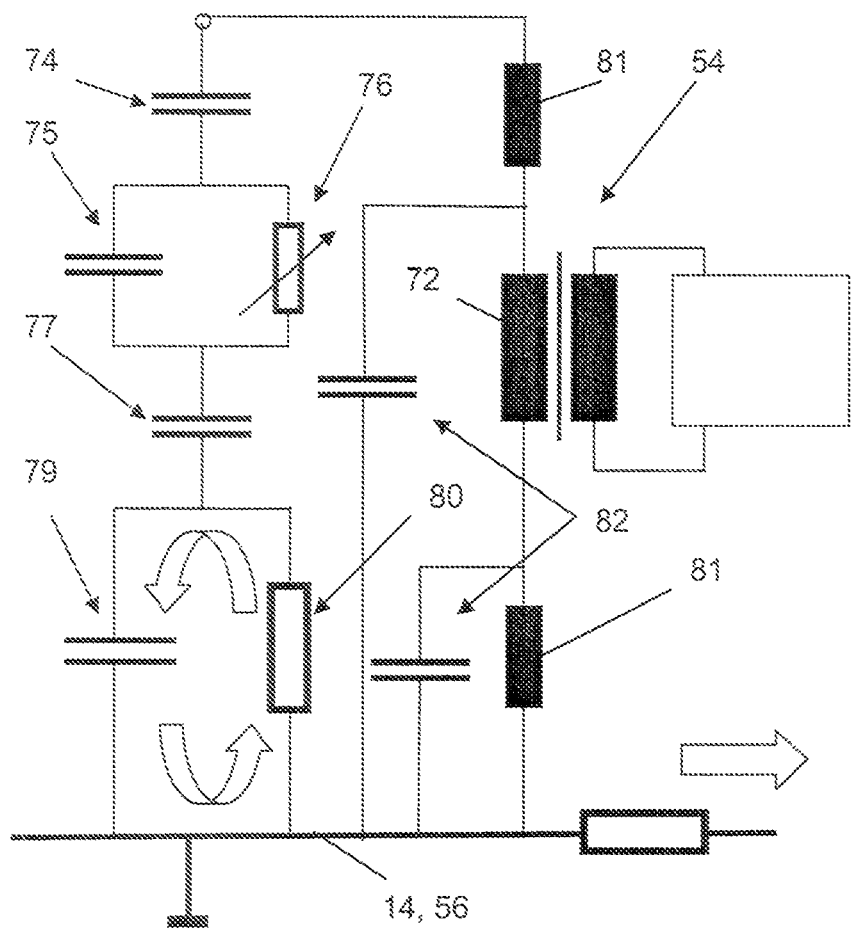
FIG. 8 illustrates a network configuration for illustration of electric problems in a light source driving circuit according to a prior art.

FIG. 8 illustrates an electrical circuit of a reactor of a prior art having cable connections to both ends of the lamp. When compared to the network scheme of FIG. 7, it can be seen that as a result of the uses of cable connections, parallel arrangements of a cable inductance 81 and stray capacitance 82 are introduced at both terminals of the secondary winding 72 of the transformer 54. These parasitic elements reduce a slope of the AC voltage generated in the secondary winding 72 due to parasitic current flow to ground and voltage drop along the cable. As can be seen in FIG. 7, the absence of parasitic elements, i.e. inductance(s) 81 and capacitance(s) 82, allows for the use of a very high frequency supply (e.g. producing alternating voltages having a slope of at least $10^9$ V/s, or at least $10^{10}$ V/s), as required for e.g. DBD lamps type lamps to function in an optimum manner.

In summary, the optical reactor according to various embodiments of the invention, includes a reactor enclosure defining a reaction chamber. In the reaction chamber, a light source operating at a very high frequency is arranged to radiate light to a fluid to be treated. The light source is energized by a driving circuit which is arranged adjacent to the reactor enclosure. A low voltage electrode is arranged to surround the light source 16. The driving circuit has a high voltage output terminal connected (e.g. directly) to a high voltage input terminal of the light source. The driving circuit has a low voltage output terminal which is connected to the low voltage electrode.

A light source suitable for the optical reactor of the present invention is a dielectric barrier discharge (DBD) lamp, in particular a dielectric barrier coupled excimer discharge lamp, and more in particular a phosphor-converted Xenon excimer discharge lamp. A DBD type lamp has an output spectrum in the UV-C wavelength range.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term "coupled," as used herein, is defined as connected, although not necessarily directly, and not necessarily mechanically.

The invention claimed is:

1. An optical reactor, comprising:
   an enclosure comprising a reaction chamber having an inlet configured to receive fluid into the reaction chamber and an outlet configured to discharge the fluid from the reaction chamber;
   a light source disposed at least partially within the reaction chamber and having a high voltage input terminal;

a low voltage electrode arranged to at least partially surround said light source;

a driving circuit for energizing the light source, wherein the driving circuit is arranged within the enclosure adjacent to and separated from the reaction chamber by a wall and having a high voltage output terminal and a low voltage output terminal electrically connected to the low voltage electrode; and a socket attached to the wall in the reaction chamber and configured to electrically connect the high voltage output terminal to the high voltage input terminal of the light source.

2. The optical reactor according to claim 1, wherein said enclosure comprises the low voltage electrode.

3. The optical reactor according to claim 2, wherein the enclosure includes an inner surface and said low voltage electrode comprises an electrically conductive layer disposed on the inner surface.

4. The optical reactor according to claim 2, wherein the enclosure includes an outer surface and said low voltage electrode comprises an electrically conductive layer disposed over the outer surface.

5. The optical reactor according to claim 2, wherein said enclosure comprises an electrically conductive material and acts as said low voltage electrode.

6. The optical reactor of claim 1, wherein the light source is a dielectric barrier discharge-type (DBD) lamp.

7. The optical reactor of claim 6, wherein the DBD lamp includes a lamp outer surface and an electrode on an outer surface of the lamp, and the low voltage output terminal is electrically connected to the electrode.

8. The optical reactor of claim 7, wherein the electrode comprises a wire mesh of electrically conducting material.

9. The optical reactor of claim 1 wherein the driving circuit is configured to energize the light source with an alternating voltage having a voltage slope of at least $10^9$ V/s.

10. The optical reactor of claim 1, wherein the enclosure comprises a substantially cylindrical shape.

11. The optical reactor of claim 1, wherein the driving circuit is configured to energize the light source with an alternating voltage having a voltage slope of at least $10^{10}$ V/s.

* * * * *